United States Patent
Schneider et al.

(10) Patent No.: US 6,404,908 B1
(45) Date of Patent: Jun. 11, 2002

(54) METHOD AND SYSTEM FOR FAST DETECTION OF LINES IN MEDICAL IMAGES

(75) Inventors: Alexander C. Schneider, Mountain View; Jimmy R. Roehrig, Palo Alto, both of CA (US)

(73) Assignee: R2 Technology, Inc., Los Altos, CA (US)

( * ) Notice: Subject to any disclaimer, the term of this patent is extended or adjusted under 35 U.S.C. 154(b) by 0 days.

(21) Appl. No.: 09/087,245

(22) Filed: May 28, 1998

(51) Int. Cl.[7] ............................. G06K 9/00; G06K 9/56; G06K 9/40; A61B 6/04
(52) U.S. Cl. ....................... 382/132; 382/205; 382/265; 382/308; 378/37
(58) Field of Search .................................. 382/128, 131, 382/132, 205, 260, 261, 262, 263, 264, 265, 308; 378/37; 128/915

(56) References Cited

U.S. PATENT DOCUMENTS

| | | | | |
|---|---|---|---|---|
| 4,851,984 A | * | 7/1989 | Doi et al. ..................... | 382/108 |
| 5,537,485 A | * | 7/1996 | Nishikawa et al. .......... | 382/130 |
| 5,579,360 A | * | 11/1996 | Abdel-Mottaleb ............ | 378/37 |
| 5,627,907 A | * | 5/1997 | Gur et al. ..................... | 382/132 |
| 5,661,820 A | * | 8/1997 | Kegelmeyer, Jr. ........... | 382/226 |
| 5,799,100 A | * | 8/1998 | Clarke et al. ................. | 382/132 |
| 5,825,910 A | * | 10/1998 | Vafai ............................ | 382/132 |
| 5,838,815 A | * | 11/1998 | Gur et al. ..................... | 382/128 |

OTHER PUBLICATIONS

G. A. Baxter, "Digital Image Processing"; ISBN: 0-471-00949-0, pp. 352-353, 1994.*

(List continued on next page.)

*Primary Examiner*—Amelia M. Au
*Assistant Examiner*—Mehrdad Dastouri
(74) *Attorney, Agent, or Firm*—Pennie & Edmonds LLP (57) ABSTRACT

A method an apparatus for detecting lines in medical images is disclosed, wherein a direction image array and a line image array are formed by filtering a digital image with a single-peaked filter, convolving the resultant array with second order difference operators oriented along the horizontal, vertical, and diagonal axes, and computing the direction image arrays and line image arrays as direct scalar functions of the results of the second order difference operations. Advantageously, line detection based on the use of four line operator functions along the horizontal, vertical, and diagonal directions in accordance with the preferred embodiments actually results in fewer computations than line detection based on the use of three line operator functions. In particular, because of the special symmetries involved, 3×3 second order difference operators may be effectively used. Moreover, the number of computations associated with the second order difference operations may be achieved with simple register shifts, additions, and subtractions, yielding an overall line detection process that is significantly less computationally intensive than prior art algorithms. Also according to a preferred embodiment, computational complexity is reduced by selecting a separable single-peaked filter, and sequentially convolving the digital image with the component kernels of the separable single-peaked filter.

63 Claims, 5 Drawing Sheets

OTHER PUBLICATIONS

Bick et al., 1995, "A New Single–Image Method for Computer–Aided Detection of Small Mammographic Masses," In:Computer Assisted Radiology: Proceedings of the International Symposium on Computer and Communication Systems for Image Guided Diagnosis and Therapy, Lemke et al., eds. CAR '95 Berlin, Jun. 21–24, 1995.

Crooks and Fallone, 1993, "A novel algorithm for the edge detection and edge enhancement of medical images," *Med. Phys.* 20(4):993–998.

Daugman, 1988, "Complete Discrete 2–D Gabor Transforms by Neural Networks for Image Analysis and Compression," *IEEE Trans. ASSP*, vol. 36:1169–79.

Feig and Yaffe, 1995, "Digital Mammography, Computer–Aided Diagnosis, and Telemammography," *The Radiologic Clinics of North America: Breast Imaging* 33(6):1205–1230.

Gonzales and Wintz, 1987, Digital Image Processing, Addison–Wesley Publishing Company, Menlo Park, California pp. 333–334.

Karssemeijer, 1994, "Recognition of stellate lesions in digital mammograms,"In: *Digital Mammography*, Gale et al., eds., pp. 211–219.

Karssemeijer, 1995, "Detection of stellate distortions in mammograms using scale space operators," In: *Information Processing in Medical Imaging*, Bizais et al., eds. Kluwer Academic Publishers, Netherlands, pp. 335–346.

Katsuragawa, 1990, "Image feature analysis and computer–aided diagnosis in digital radiography: Effect of digital parameters on the accuracy of computerized analysis of interstitial disease in digital chest radiographs," *Med. Phys.* 17(1):72–78.

Koenderink and Van Doorn, 1992, "Generic Neighborhood Operations," *IEEE Transactions on Pattern Analysis and Machine Intelligence* 14(6):597–605.

Lin et al., "Application of Neural Networks for Improvement of Lung Nodule Detection in Digital Chest Radiographs," pp. IV–20–IV–23.

Nishikawa et al., "Computer–aided Detection and Diagnosis of Masses and Clustered Microcalcifications from Digital Mammograms," In: *State of the Art in Digital Mammographic Image Analysis*, Bowyer and Astley, eds. World Scientific Publishing Co., 1993.

Tahoces et al., 1995, "Computer–assisted diagnosis: the classification of mammographic breast parenchymal patterns," *Phys. Med. Biol.* 40:103–117.

te Brake and Karssemeijer, 1996, "Detection of Stellate Breast Abnormalities," In: *Digital Mammography '96*, Doi et al., eds. Elsevier Science B. V. pp. 341–346.

Yoshimura et al., 1992, "Computerized Scheme for the Detection of Pulmonary Nodules: A Nonlinear Filtering Technique," *Invest. Radiol.* 27:124–129.

Zhang and Giger, 1995, "Automated detection of spiculated lesions and architectural distortions of digitized mammograms," *SPIE 2434*:846–854.

\* cited by examiner

METHOD AND SYSTEM FOR FAST DETECTION OF LINES IN MEDICAL IMAGES

FIELD OF THE INVENTION

The present invention relates to the field of computer aided analysis of medical images. In particular, the present invention relates to a fast method for detecting lines in medical images.

BACKGROUND OF THE INVENTION

Line detection is an important first step in many medical image processing algorithms. For example, line detection is an important early step of the algorithm disclosed in U.S. patent application Ser. No. 08/676,660, entitled "Method and Apparatus for Fast Detection of Spiculated Lesions in Digital Mammograms," filed Jul. 19, 1996, the contents of which are hereby incorporated by reference into the present application. Generally speaking, if the execution time of the line detection step can be shortened, then the execution time of the overall medical image processing algorithm employing that line detection step can be shortened.

In order to clearly illustrate the features and advantages of the preferred embodiments, the present disclosure will describe the line detection algorithms of both the prior art and the preferred embodiments in the context of the computer-assisted diagnosis system of U.S. patent application Ser. No. 08/676,660, supra. Importantly, however, the scope of the preferred embodiments is not so limited, the features and advantages of the preferred embodiments being applicable to a variety of image processing applications.

Figure 1:
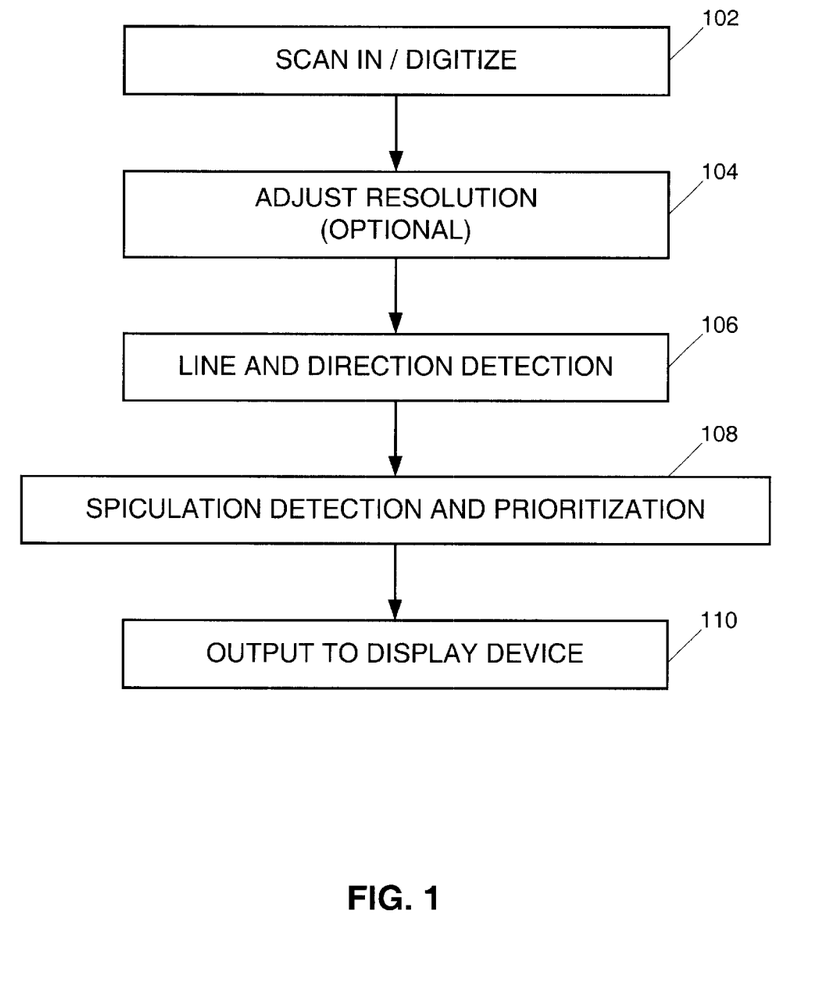
FIG. 1 shows steps taken by a computer-aided diagnosis ("CAD") system for detecting spiculations in digital mammograms in accordance with the prior art.

FIG. 1 shows steps performed by a computer-assisted diagnosis unit similar to that described in U.S. patent application Ser. No. 08/676,660, which is adapted to detect abnormal spiculations or lesions in digital mammograms. At step 102, an x-ray mammogram is scanned in and digitized into a digital mammogram. The digital mammogram may be, for example, a 4000×5000 array of 12-bit gray scale pixel values. Such a digital mammogram would generally correspond to a typical 8"×10" x-ray mammogram which has been digitized at 50 microns (0.05 mm) per pixel.

At step 104, which is generally an optional step, the digital mammogram image is locally averaged, using steps known in the art, down to a smaller size corresponding, for example, to a 200 micron (0.2 mm) spatial resolution. The resulting digital mammogram image that is processed by subsequent steps is thus approximately 1000×1250 pixels. As is known in the art, a digital mammogram may be processed at different resolutions depending on the type of features being detected. If, for example, the scale of interest is near the order of magnitude 1 mm–10 mm, i.e., if lines on the order of 1 mm–10 mm are being detected, it is neither efficient nor necessary to process a full 50-micron (0.05 mm) resolution digital mammogram. Instead, the digital mammogram is processed at a lesser resolution such as 200 microns (0.2 mm) per pixel.

Generally speaking, it is to be appreciated that the advantages and features of the preferred embodiments disclosed infra are applicable independent of the size and spatial resolution of the digital mammogram image that is processed. Nevertheless, for clarity of disclosure, and without limiting the scope of the preferred embodiments, the digital mammogram images in the present disclosure, which will be denoted by the symbol I, will be M×N arrays of 12-bit gray scale pixel values, with M and N having exemplary values of 1000 and 1250, respectively.

At step 106, line and direction detection is performed on the digital mammogram image I. At this step, an M×N line image $L(i,j)$ and an M×N direction image $\theta_{max}(i,j)$ are generated from the digital mammogram image I. The M×N line image $L(i,j)$ generated at step 106 comprises, for each pixel $(i,j)$, line information in the form of a "1" if that pixel has a line passing through it, and a "0" otherwise. The M×N direction image $\theta_{max}(i,j)$ comprises, for those pixels $(i,j)$ having a line image value of "1", the estimated direction of the tangent to the line passing through the pixel $(i,j)$. Alternatively, of course, the direction image $\theta_{max}(i,j)$ may be adjusted by 90 degrees to correspond to the direction orthogonal to the line passing through the pixel $(i,j)$.

At step 108, information in the line and direction images is processed for determining the locations and relative priority of spiculations in the digital mammogram image I. The early detection of spiculated lesions ("spiculations") in mammograms is of particular importance because a spiculated breast tumor has a relatively high probability of being malignant.

Finally, at step 110, the locations and relative priorities of suspicious spiculated lesions are output to a display device for viewing by a radiologist, thus drawing his or her attention to those areas. The radiologist may then closely examine the corresponding locations on the actual film x-ray mammogram. In this manner, the possibility of missed diagnosis due to human error is reduced.

One of the desired characteristics of a spiculation-detecting CAD system is high speed to allow processing of more x-ray mammograms in less time. As indicated by the steps of FIG. 1, if the execution time of the line and direction detection step 106 can be shortened, then the execution time of the overall mammogram spiculation detection algorithm can be shortened.

A first prior art method for generating line and direction images is generally disclosed in Gonzales and Wintz, *Digital Image Processing* (1987) at 333–34. This approach uses banks of filters, each filter being "tuned" to detect lines in a certain direction. Generally speaking, this "tuning" is achieved by making each filter kernel resemble a second-order directional derivative operator in that direction. Each filter kernel is separately convolved with the digital mammogram image I. Then, at each pixel $(i,j)$, line orientation can be estimated by selecting the filter having the highest output at $(i,j)$, and line magnitude may be estimated from that output and other filter outputs. The method can be generalized to lines having pixel widths greater than 1 in a multiscale representation shown in Daugman, "Complete Discrete 2-D Gabor Transforms by Neural Networks for Image Analysis and Compression," *IEEE Trans. ASSP*, Vol. 36, pp. 1169–79 (1988).

The above filter-bank algorithms are computationally intensive, generally requiring a separate convolution operation for each orientation-selective filter in the filter bank. Additionally, the accuracy of the angle estimate depends on the number of filters in the filter bank, and thus there is an implicit tradeoff between the size of the filter bank (and thus total computational cost) and the accuracy of angle estimation.

A second prior art method of generating line and direction images is described in Karssemeijer, "Recognition of Stellate Lesions in Digital Mammograms," *Digital Mammography: Proceedings of the 2nd International Workshop on Digital Mammography*, York, England, (Jul. 10–12, 1994) at 211–19, and in Karssemeijer, "Detection of Stellate Distortions in Mammograms using Scale Space Operators," *Infor-*

*mation Processing in Medical Imaging* 335–46 (Bizais et al., eds. 1995) at 335–46. A mathematical foundation for the Karssemeijer approach is found in Koenderink and van Doom, "Generic Neighborhood Operators," *IEEE Transactions on Pattern Analysis and Machine Intelligence*, Vol. 14, No. 6 (June 1992) at 597–605. The contents of each of the above two Karssemeijer references and the above Koenderink reference are hereby incorporated by reference into the present application.

The Karssemeijer algorithm uses scale space theory to provide an accurate and more efficient method of line detection relative to the filter-bank method. More precisely, at a given level of spatial scale σ, Karssemeijer requires the convolution of only three kernels with the digital mammogram image I, the angle estimation at a pixel (i,j) then being derived as a trigonometric function of the three convolution results at (i,j).

Figure 2:
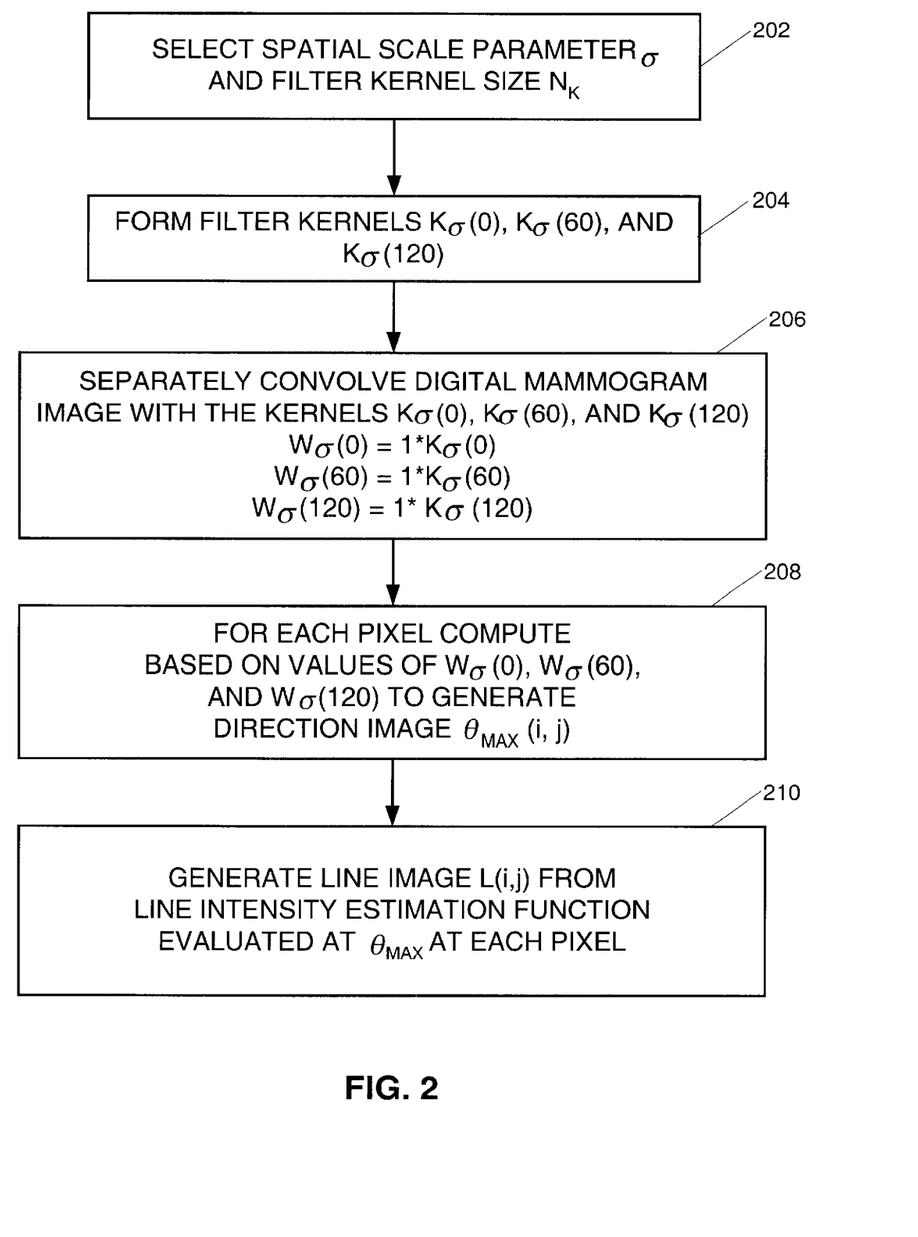
FIG. 2 shows line detection steps taken by the CAD system of FIG. 1.

FIG. 2 shows steps for computing line and direction images in accordance with the Karssemeijer algorithm. At step 202, a spatial scale parameter σ and a filter kernel size $N_k$ are selected. The spatial scale parameter σ dictates the width, in pixels, of a Gaussian kernel G(r,σ), the equation for which is shown in Eq. (1):

$$G(r,\sigma)=(\tfrac{1}{2}\pi\sigma^2)\exp(-r^2/2\sigma^2) \quad (1)$$

At step 202, the filter kernel size $N_k$, in pixels, is generally chosen to be large enough to contain the Gaussian kernel G(r,σ) in digital matrix form, it being understood that the function G(r,σ) becomes quite small very quickly. Generally speaking, the spatial scale parameter σ corresponds, in an order-of-magnitude sense, to the size of the lines being detected. By way of example only, and not by way of limitation, for detecting 1 mm–10 mm lines in fibrous breast tissue in a 1000×1250 digital mammogram at 200 micron (0.2 mm) resolution, the value of σ may be selected as 1.5 pixels and the filter kernel size $N_k$ may be selected as 11 pixels. For detecting different size lines or for greater certainty of results, the algorithm or portions thereof may be repeated using different values for σ and the kernel size.

At step 204, three filter kernels $K_\sigma(0)$, $K_\sigma(60)$, and $K_\sigma(120)$ are formed as the second order directional derivatives of the Gaussian kernel G(r,σ) at 0 degrees, 60 degrees, and 120 degrees, respectively. The three filter kernels $K_\sigma(0)$, $K_\sigma(60)$, and $K_\sigma(120)$ are each of size $N_k$, each filter kernel thus containing $N_k \times N_k$ elements.

At step 206, the digital mammogram image I is separately convolved with each of the three filter kernels $K_\sigma(0)$, $K_\sigma(60)$, and $K_\sigma(120)$ to produce three line operator functions $W_\sigma(0)$, $W_\sigma(60)$, and $W_\sigma(120)$, respectively, as shown in Eq. (2):

$$W_\sigma(0)=I*K_\sigma(0)$$
$$W_\sigma(60)=I*K_\sigma(60)$$
$$W_\sigma(120)=I*K_\sigma(120) \quad (2)$$

Each of the line operator functions $W_\sigma(0)$, $W_\sigma(60)$, and $W_\sigma(120)$ is, of course, a two-dimensional array that is slightly larger than the original M×N digital mammogram image array I due to the size $N_k$ of the filter kernels.

Subsequent steps of the Karssemeijer algorithm are based on a relation shown in Koenderink, supra, which shows that an estimation function $W_\sigma(\theta)$ may be formed as a combination of the line operator functions $W_\sigma(0)$, $W_\sigma(60)$, and $W_\sigma(120)$ as defined in equation (3):

$$W_\sigma(\theta)=(\tfrac{1}{3})(1+2\cos(2\theta))W_\sigma(0)+(\tfrac{1}{3})(1-\cos(2\theta)+(\sqrt{3})\sin(2\theta))W_\sigma(60)+(\tfrac{1}{3})(1-\cos(2\theta)-(\sqrt{3})\sin(2\theta))W_\sigma(120) \quad (3)$$

As indicated by the above definition, the estimation function $W_\sigma(\theta)$ is a function of three variables, the first two variables being pixel coordinates (i,j) and the third variable being an angle θ. For each pixel location (i,j), the estimation function $W_\sigma(\theta)$ represents a measurement of line strength at pixel (i,j) in the direction perpendicular to θ. According to the Karssemeijer method, an analytical expression for the extrema of $W_\sigma(\theta)$ with respect to θ, denoted $\theta_{min,max}$ at a given pixel (i,j) is given by Eq. (4):

$$\theta_{min,max}=\tfrac{1}{2}[\arctan\{(\sqrt{3})(W_\sigma(60)-W_\sigma(120))/(W_\sigma(60)+W_\sigma(120)-2W_\sigma(0))\}\pm\pi] \quad (4)$$

Thus, at step 208, the expression of Eq. (4) is computed for each pixel based on the values of $W_\sigma(0)$, $W_\sigma(60)$, and $W_\sigma(120)$ that were computed at step 206. Of the two solutions to equation (4), the direction $\theta_{max}$ is then selected as the solution that yields the larger magnitude for $W_\sigma(\theta)$ at that pixel, denoted $W_\sigma(\theta_{max})$. Thus, at step 208, an array $\theta_{max}(i,j)$ is formed that constitutes the direction image corresponding to the digital mammogram image I. As an outcome of this process, a corresponding two-dimensional array of line intensities corresponding to the maximum direction $\theta_{max}$ at each pixel is formed, denoted as the line intensity function $W_\sigma(\theta_{max})$.

At step 210, a line image L(i,j) is formed using information derived from the line intensity function $W_\sigma(\theta_{max})$ that was inherently generated during step 208. The array L(i,j) is formed from $W_\sigma(\theta_{max})$ using known methods such as a simple thresholding process or a modified thresholding process based on a histogram of $W_\sigma(\theta_{max})$. With the completion of the line image array L(i,j) and the direction image array $\theta_{max}(i,j)$, the line detection process is complete.

Optionally, in the Karssemeijer algorithm a plurality of spatial scale values σ1, σ2, . . . , σn may be selected at step 202. The steps 204–210 are then separately carried out for each of the spatial scale values σ1, σ2, . . . , σn. For a given pixel (i,j), the value of $\theta_{max}(i,j)$ is selected to correspond to the largest value among $W_{\sigma 1}(\theta_{max1})$, $W_{\sigma 2}(\theta_{max2})$, . . . , $W_{\sigma n}(\theta_{maxn})$. The line image L(i,j) is formed by thresholding an array corresponding to largest value among $W_{\sigma 1}(\theta_{max1})$, $W_{\sigma 2}(\theta_{max2})$, . . . , $W_{\sigma n}(\theta_{maxn})$ at each pixel.

Although it is generally more computationally efficient than the filter-bank method, the prior art Karssemeijer algorithm has computational disadvantages. In particular, for a given spatial scale parameter σ, the Karssemeijer algorithm requires three separate convolutions of $N_k \times N_k$ kernels with the M×N digital mammogram image I. Each convolution, in turn, requires approximately $M \cdot N \cdot (N_k)^2$ multiplication and addition operations, which becomes computationally expensive as the kernel size $N_k$, which is proportional to the spatial scale parameter σ, grows. Thus, for a constant digital mammogram image size, the computational intensity of the Karssemeijer algorithm generally grows according to the square of the scale of interest.

Accordingly, it would be desirable to provide a line detection algorithm for use in a medical imaging system that is less computationally intensive, and therefore faster, than the above prior art algorithms.

It would further be desirable to provide a line detection algorithm for use in a medical imaging system that is capable of operating at multiple spatial scales for detecting lines of varying widths.

It would be even further desirable to provide a line detection algorithm for use in a medical imaging system in which, as the scale of interest grows, the computational intensity grows at a rate less than the rate of growth of the square of the scale of interest.

SUMMARY OF THE INVENTION

These and other objects are provided for by a method and apparatus for detecting lines in a medical imaging system by filtering the digital image with a single-peaked filter, convolving the resultant array with second order difference operators oriented along the horizontal, vertical, and diagonal axes, and computing direction image arrays and line image arrays as direct scalar functions of the results of the second order difference operations. Advantageously, it has been found that line detection based on the use of four line operator functions can actually require fewer computations than line detection based on the use of three line operator functions, if the four line operator functions correspond to the special orientations of 0, 45, 90, and 135 degrees. Stated another way, it has been found that the number of required computations is significantly reduced where the aspect ratio of the second order difference operators corresponds to the angular distribution of the line operator functions. Thus, where the second order difference operators are square kernels, having an aspect ratio of unity, the preferred directions of four line operator functions is at 0, 45, 90, and 135 degrees.

In a preferred embodiment, a spatial scale parameter is selected that corresponds to a desired range of line widths for detection. The digital image is then filtered with a single-peaked filter having a size related to the spatial scale parameter, to produce a filtered image array. The filtered image array is separately convolved with second order difference operators at 0, 45, 90, and 135 degrees. The direction image array and the line image array are then computed at each pixel as scalar functions of the elements of the arrays resulting from these convolutions. Because of the special symmetries involved, the second order difference operators may be 3×3 kernels. Moreover, the number of computations associated with the second order difference operations may be achieved with simple register shifts, additions, and subtractions, yielding an overall line detection process that is significantly less computationally intensive than prior art algorithms.

In another preferred embodiment, the digital image is first convolved with a separable single-peaked filter kernel, such as a Gaussian. Because a separable function may be expressed as the convolution of a first one dimensional kernel and a second one dimensional kernel, the convolution with the separable single-peaked filter kernel is achieved by successive convolutions with a first one dimensional kernel and a second one dimensional kernel, which significantly reduces computation time in generating the filtered image array. The filtered image array is then convolved with three 3×3 second order difference operators, the first such operator comprising the difference between a horizontal second order difference operator and a vertical difference operator, the second such operator comprising the difference between a first diagonal second order difference operator and a second diagonal second order difference operator, and the third such operator being a Laplacian operator. Because of the special symmetries associated with the selection of line operator functions at 0, 45, 90, and 135 degrees, the direction image array and the line image array are then computed at each pixel as even simpler scalar functions of the elements of the arrays resulting from the three convolutions.

Thus, line detection algorithms in accordance with the preferred embodiments are capable of generating line and direction images using significantly fewer computations than prior art algorithms by taking advantage of the separability of Gaussians and other symmetric filter kernels, while also taking advantage of discovered computational simplifications that result from the consideration of four line operator functions oriented in the horizontal, vertical, and diagonal directions.

DETAILED DESCRIPTION

Figure 3:
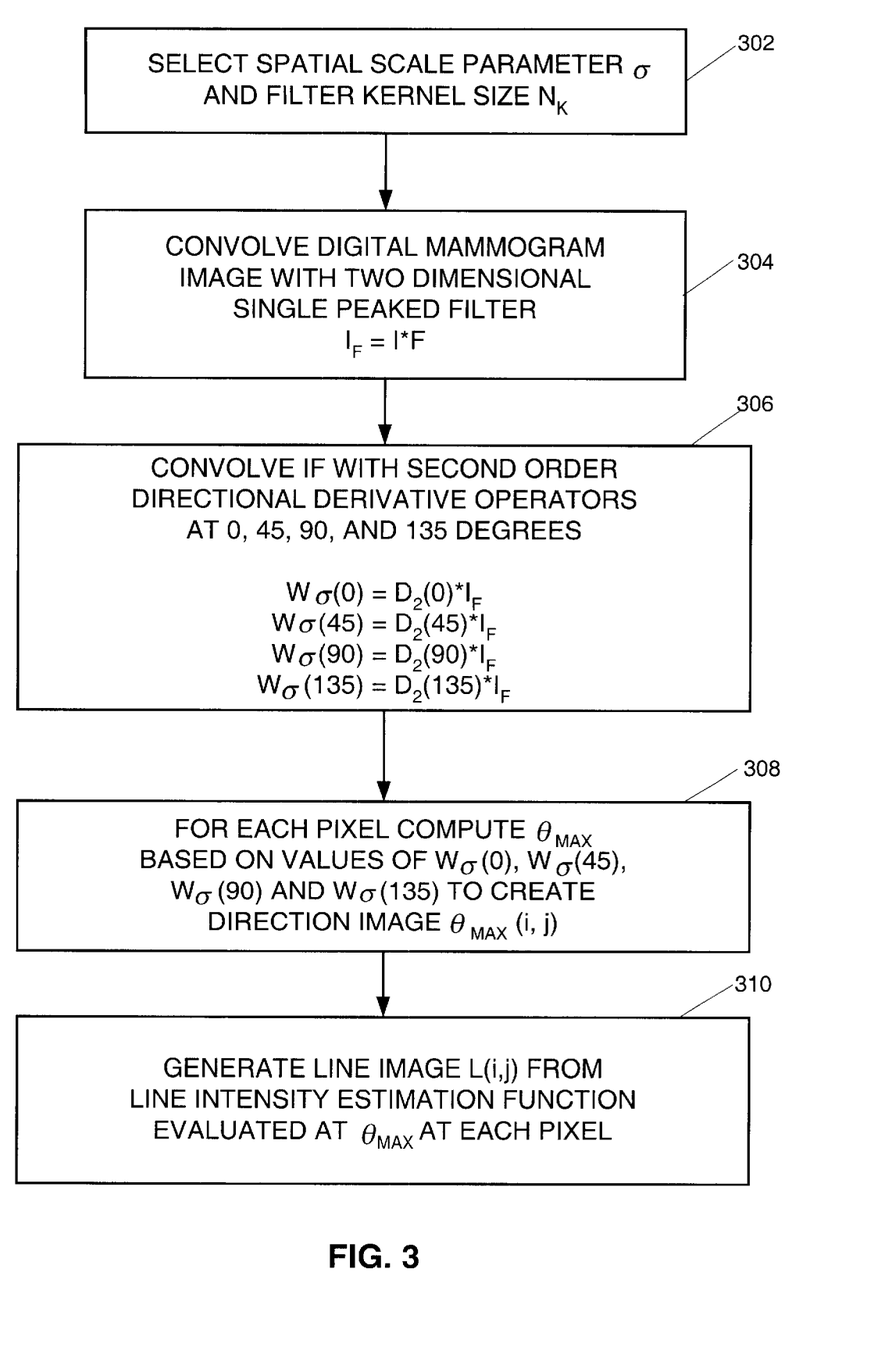
FIG. 3 shows line detection steps according to a preferred embodiment.

FIG. 3 shows steps of a line detection algorithm in accordance with a preferred embodiment. At step 302, a spatial scale parameter σ and a filter kernel size $N_k$ are selected in manner similar to that of step 202 of FIG. 2. However, in a line detection system according to a preferred embodiment, it is possible to make these factors larger than with the prior art system of FIG. 2 while not increasing the computational intensity of the algorithm. Alternatively, in a line detection system according to a preferred embodiment, these factors may remain the same as with the prior art system of FIG. 2 and the computational intensity of the algorithm will be reduced. As a further alternative, in a line detection system according to a preferred embodiment, it is possible to detect lines using a greater number of different spatial scales of interest σ while not increasing the computational intensity of the algorithm.

At step 304, the digital mammogram image I is convolved with a two-dimensional single-peaked filter F having dimensions $N_k \times N_k$ to form a filtered image array $I_F$ as shown in Eq. (5):

$$I_F = I * F \tag{5}$$

By single-peaked filter, it is meant that the filter F is a function with a single maximum point or single maximum region. Examples of such a filter include the Gaussian, but may also include other filter kernels such as a Butterworth filter, an inverted triangle or parabola, or a flat "pillbox" function. It has been found, however, that a Gaussian filter is the most preferable. The size of the single-peaked filter F is dictated by the spatial scale parameter σ. For example, where a Gaussian filter is used, σ is the standard deviation of the Gaussian, and where a flat pillbox function is used, σ corresponds to the radius of the pillbox. In subsequent steps it is assumed that a Gaussian filter is used, although the algorithm may be adapted by one skilled in the art to use other filters.

At step 306, the filtered image array $I_F$ is then separately convolved with second order directional derivative operators. In accordance with a preferred embodiment, it is computationally advantageous to compute four directional derivatives at 0, 45, 90, and 135 degrees by convolving filtered image array $I_F$ with second order directional derivative operators $D_2(0)$, $D_2(45)$, $D_2(90)$, and $D_2(135)$ to produce the line operator function $W_o(0)$, $W_o(45)$, $W_o(90)$, and $W_o(135)$, respectively, as shown in Eqs. (6a)–(6d).

$$W_\sigma(0) = I_F * D_2(0) \tag{6a}$$

$$W_\sigma(45) = I_F * D_2(45) \tag{6b}$$

$$W_\sigma(90) = I_F * D_2(90) \tag{6c}$$

$$W_\sigma(135) = I_F * D_2(135) \tag{6d}$$

Advantageously, because the particular directions of 0, 45, 90, and 135 degrees are chosen, these directional derivative operators are permitted to consist of the small 3×3 kernels shown in Eqs. (7a)–(7d):

$$D_2(0) = \begin{matrix} 0 & 0 & 0 \\ -1 & 2 & -1 \\ 0 & 0 & 0 \end{matrix} \tag{7a}$$

$$D_2(45) = \begin{matrix} 0 & 0 & -1 \\ 0 & 2 & 0 \\ -1 & 0 & 0 \end{matrix} \tag{7b}$$

$$D_2(90) = \begin{matrix} 0 & -1 & 0 \\ 0 & 2 & 0 \\ 0 & -1 & 0 \end{matrix} \tag{7c}$$

$$D_2(135) = \begin{matrix} -1 & 0 & 0 \\ 0 & 2 & 0 \\ 0 & 0 & -1 \end{matrix} \tag{7d}$$

The above 3×3 second order directional derivative operators are preferred, as they result in fewer computations than larger second order directional derivative operators while still providing a good estimate of the second order directional derivative when convolved with the filtered image array $I_F$. However, the scope of the preferred embodiments is not necessarily so limited, it being understood that larger operators for estimating the second order directional derivatives may be used if a larger number of computations is determined to be acceptable. For a minimal number of computations in accordance with a preferred embodiment, however, 3×3 kernels are used.

Subsequent steps are based on an estimation function $W_o(\theta)$ that can be formed from the arrays $W_o(0)$, $W_o(45)$, $W_o(90)$, and $W_o(135)$ by adapting the formulas in Koenderink, supra, for four estimators spaced at intervals of 45 degrees. The resulting formula is shown below in Eq. (8).

$$W_\sigma(\theta) = \tfrac{1}{4}\{(1+2\cos(2\theta))W_\sigma(0) + (1+2\sin(2\theta))W_\sigma(45) + (1-2\cos(2\theta))W_\sigma(90) + (1-2\sin(2\theta))W_\sigma(135)\} \tag{8}$$

It has been found that the extrema of the estimation function $W_o(\theta)$ with respect to $\theta$, denoted $\theta_{min,max}$ at a given pixel (i,j) is given by Eq. (9):

$$\theta_{min,max} = \tfrac{1}{2}[\arctan\{(W_\sigma(45) - W_\sigma(135))/(W_\sigma(0) - W_\sigma(90))\} \pm \pi] \tag{9}$$

At step 308, the expression of Eq. (9) is computed for each pixel. Of the two solutions to equation (4), the direction $\theta_{max}$ is then selected as the solution that yields the larger magnitude for $W_o(\theta)$ at that pixel, denoted as the line intensity $W_o(\theta_{max})$. Thus, at step 308, an array $\theta_{max}(i,j)$ is formed that constitutes the direction image corresponding to the digital mammogram image I. As an outcome of this process, a corresponding two-dimensional array of line intensities corresponding to the maximum direction $\theta_{max}$ at each pixel is formed, denoted as the line intensity function $W_o(\theta_{max})$.

At step 310, a line image array $L(i,j)$ is formed using information derived from the line intensity function $W_o(\theta_{max})$ that was inherently generated during step 308. The line image array $L(i,j)$ is formed from the line intensity function $W_o(\theta_{max})$ using known methods such as a simple thresholding process or a modified thresholding process based on a histogram of the line intensity function $W_o(\theta_{max})$. With the completion of the line image array $L(i,j)$ and the direction image array $\theta_{max}(i,j)$, the line detection process is complete.

Figure 4:
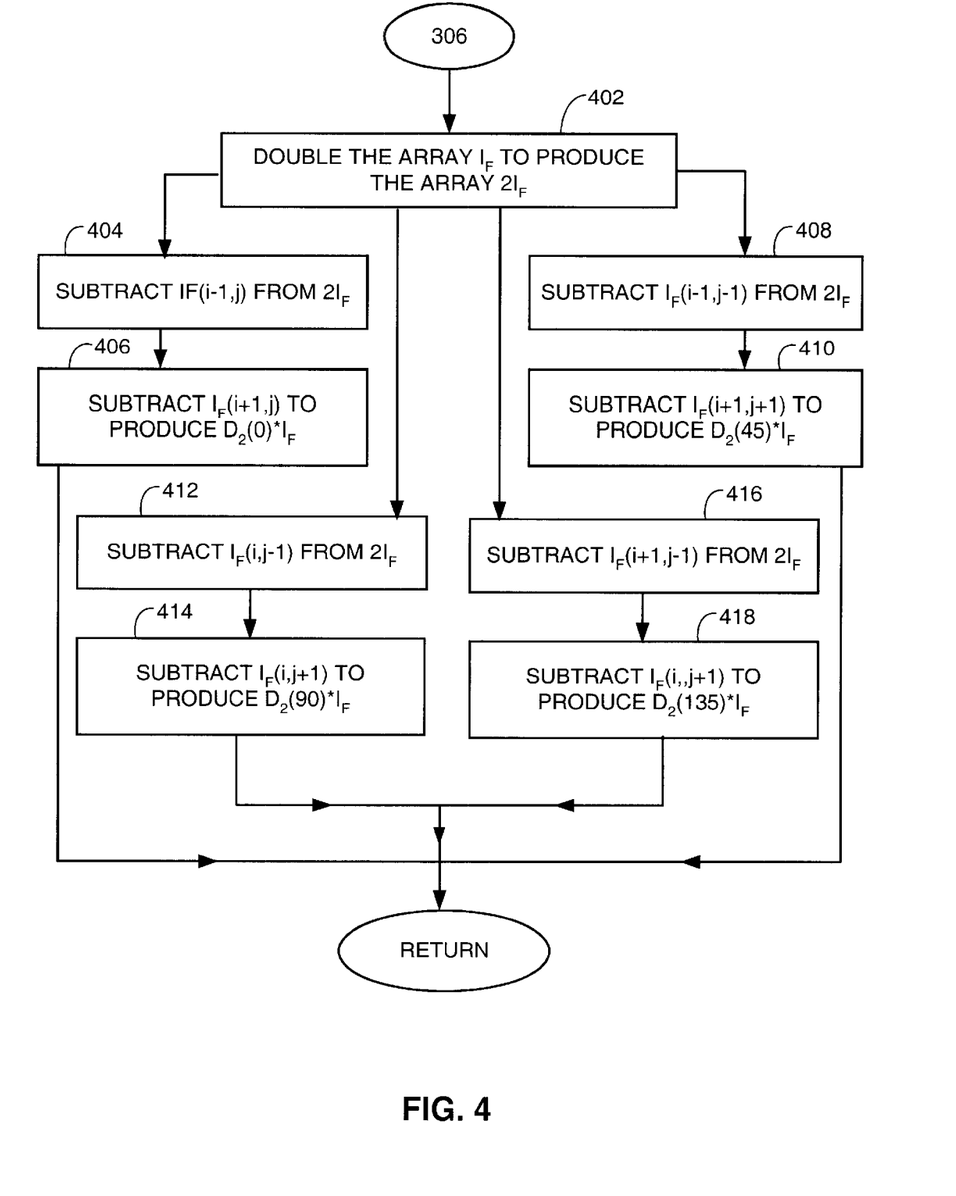
FIG. 4 shows steps for convolution with second order directional derivative operators in accordance with a preferred embodiment.

FIG. 4 illustrates unique computational steps corresponding to the step 306 of FIG. 3. At step 306, the filtered image array $I_F$ is convolved with the second order directional derivative operators $D_2(0)$, $D_2(45)$, $D_2(90)$, and $D_2(135)$ shown in Eq. (7). An advantage of the use of the small 3×3 kernels $D_2(0)$, $D_2(45)$, $D_2(90)$, and $D_2(135)$ evidences itself in the convolution operations corresponding to step 306. In particular, because each of the directional derivative operators has only 3 nonzero elements −1, 2, and −1, general multiplies are not necessary at all in step 306, as the multiplication by 2 just corresponds to a single left bitwise register shift and the multiplications by −1 are simply sign inversions. Indeed, each convolution operation of Eq. (6) can be simply carried out at each pixel by a single bitwise left register shift followed by two subtractions of neighboring pixel values from the shifted result.

Thus, at step 402 each pixel in the filtered image array $I_F$ is doubled to produce the doubled filtered image array $2I_F$. This can be achieved through a multiplication by 2 or, as discussed above, a single bitwise left register shift. At step 404, at each pixel (i,j) in the array $2I_F$, the value of $I_F(i-1,j)$ is subtracted, and at step 406, the value of $I_F(i+1,j)$ is subtracted, the result being equal to the desired convolution result $I_F * D_2(0)$ at pixel (i,j). Similarly, at step 408, at each pixel (i,j) in the array $2I_F$, the value of $I_F(i-1,j-1)$ is subtracted, and at step 410, the value of $I_F(i+1,j+1)$ is subtracted, the result being equal to the desired convolution result $I_F * D_2(45)$ at pixel (i,j). Similarly, at step 412, at each pixel (i,j) in the array $2I_F$, the value of $I_F(i,j-1)$ is subtracted, and at step 414, the value of $I_F(i,j+1)$ is subtracted, the result being equal to the desired convolution result $I_F * D_2(90)$ at pixel (i,j). Finally, at step 416, at each pixel (i,j) in the array $2I_F$, the value of $I_F(i+1,j-1)$ is subtracted, and at step 418, the value of $I_F(i-1,j+1)$ is subtracted, the result being equal to the desired convolution result $I_F * D_2(135)$ at pixel (i,j). The steps 406–418 are preferably carried out in the parallel fashion shown in FIG. 4 but can generally be carried out in any order.

Thus, it is to be appreciated that in the embodiment of FIGS. 3 and 4 a line detection algorithm is executed using four line operator functions $W_o(0)$, $W_o(45)$, $W_o(90)$, and $W_o(135)$ while at the same time using fewer computations than the Karssemeijer algorithm of FIG. 2, which uses only three line operator functions $W_o(0)$, $W_o(60)$, $W_o(120)$. In accordance with a preferred embodiment, the algorithm of FIGS. 3 and 4 takes advantage of the interchangeability of the derivative and convolution operations while also taking advantage of the finding that second order directional derivative operators in each of the four directions 0, 45, 90, and 135 degrees may be implemented using small 3×3 kernels each having only three nonzero elements −1, 2, and −1. In the Karssemeijer algorithm of FIG. 2, there are three convolutions of the M×N digital mammogram image I with the $N_k \times N_k$ kernels, requiring approximately $3 \cdot (N_k)^2 \cdot M \cdot N$ multiplications and adds to derive the three line estimator functions $W_o(0)$, $W_o(60)$, and $W_o(120)$. However, in the embodiment of FIGS. 3 and 4, the computation of the four line estimator functions $W_o(0)$, $W_o(45)$, $W_o(90)$, and $W_o(135)$ requires a first convolution requiring $(N_k)^2 \cdot M \cdot N$ multiplications, followed by M·N doubling operations and 8·M·N subtractions, which is a very significant computational advantage. The remaining portions of the different algorithms take approximately the same amount of computations once the line estimator functions are computed.

For illustrative purposes in comparing the algorithm of FIGS. 3 and 4 with the prior art Karssemeijer algorithm of FIG. 2, let us assume that the operations of addition, subtraction, and register-shifting operation take 10 clock cycles each, while the process of multiplication takes 30 clock cycles. Let us further assume that an exemplary digital mammogram of M×N=1000×1250 is used and that $N_k$ is 11. For comparison purposes, it is most useful to look at the operations associated with the required convolutions, as they require the majority of computational time. For this set of parameters, the Karssemeijer algorithm would require $3(11)^2(1000)(1250)(30+10)=18.2$ billion clock cycles to compute the three line estimator functions $W_o(0)$, $W_o(60)$, and $W_o(120)$. In contrast, the algorithm of FIGS. 3 and 4 would require only $(11)^2(1000)(1250)(30+10)+(1250)(1000)(10)+8(1250)(1000)(10)=6.2$ billion clock cycles to generate the four line operator functions $W_o(0)$, $W_o(45)$, $W_o(90)$, and $W_o(135)$, a significant computational advantage.

Figure 5:
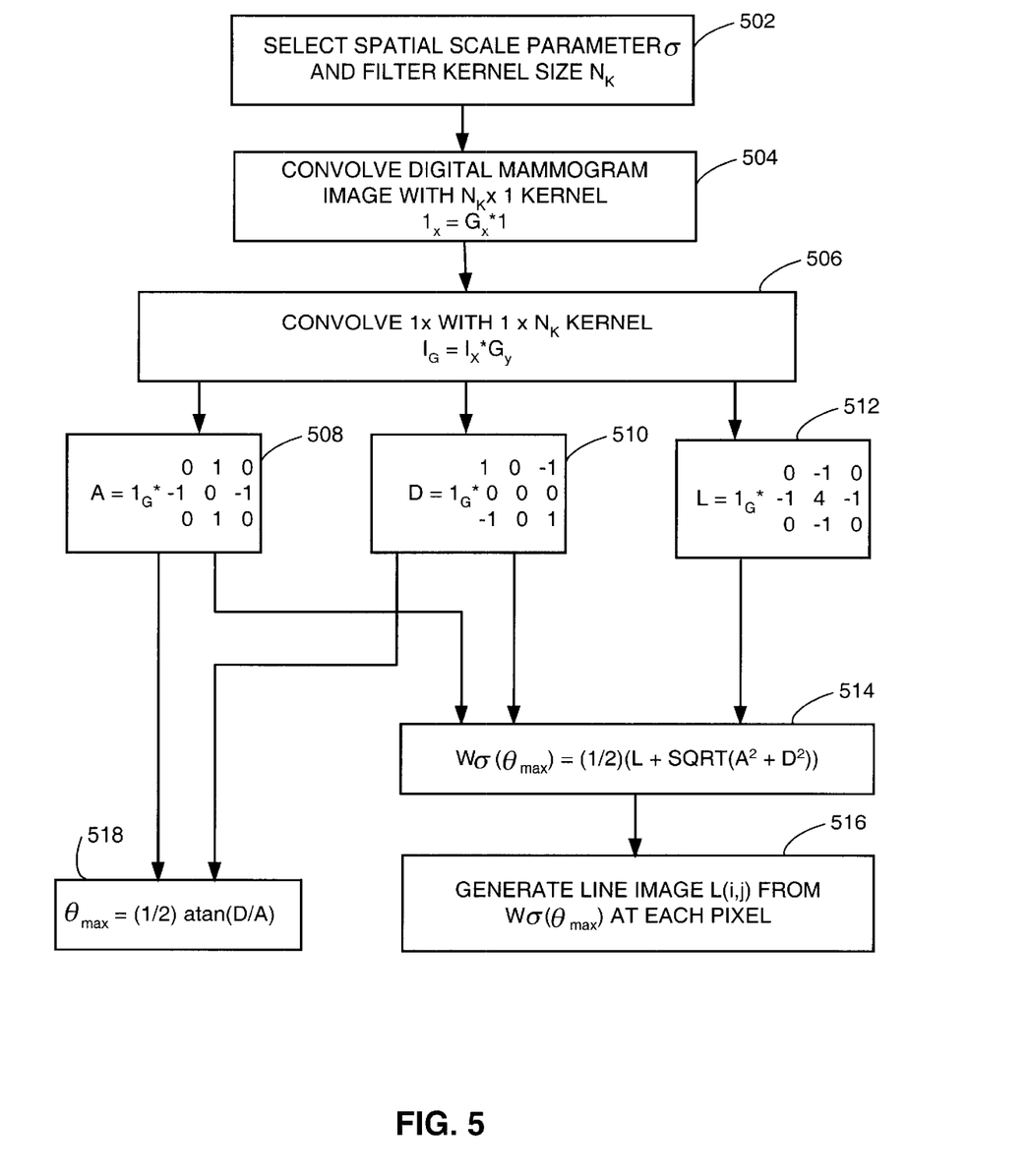
FIG. 5 shows line detection steps according to another preferred embodiment.

FIG. 5 shows steps of a line detection algorithm in accordance with another preferred embodiment. It has been found that the algorithm of FIGS. 3 and 4 can be made even more computationally efficient where the single-peaked filter kernel F is selected to be separable. Generally speaking, a separable kernel can be expressed as a convolution of two kernels of lesser dimensions, such as one-dimensional kernels. Thus, the $N_k \times N_k$ filter kernel F(i,j) is separable where it can be formed as a convolution of an $N_k \times 1$ kernel $F_x(i)$ and a $1 \times N_k$ kernel $F_y(j)$, i.e., $F(i,j)=F_x(i)*F_y(j)$. As known in the art, an $N_k \times 1$ kernel is analogous to a row vector of length $N_k$ while a $1 \times N_k$ kernel is analogous to a column vector of length $N_k$.

Although a variety of single-peaked functions are within the scope of the preferred embodiments, the most optimal function has been found to be the Gaussian function of Eq. (1), supra. For purposes of the embodiment of FIG. 5, and without limiting the scope of the preferred embodiments, the filter kernel notation F will be replaced by the notation G to indicate that a Gaussian filter is being used:

$$G = (1/2\pi\sigma^2)\exp(-x^2/2\sigma^2)\exp(-y^2/2\sigma^2) \quad (10)$$
$$= G_x * G_y$$

$$G_x = [g_{x,0}\ g_{x,1}\ g_{x,2}\ \cdots\ g_{x,Nk-1}] \quad (11)$$

$$G_y = \begin{bmatrix} g_{y,0} \\ g_{y,1} \\ g_{y,2} \\ \vdots \\ g_{y,Nk-1} \end{bmatrix} \quad (12)$$

At step 502, the parameters $\sigma$ and $N_k$ are selected in a manner similar to step 302 of FIG. 3. It is preferable for $N_k$ to be selected as an odd number, so that a one-dimensional Gaussian kernel of length $N_k$ may be symmetric about its central element. At step 504, the M×N digital mammogram image I is convolved with the Gaussian $N_k \times 1$ kernel $G_x$ to produce an intermediate array $I_x$:

$$I_x = G_x * I \quad (13)$$

In accordance with a preferred embodiment, the sigma of the one-dimensional Gaussian kernel $G_x$ is the spatial scale parameter $\sigma$ selected at step 502. The intermediate array $I_x$ resulting from step 504 is a two-dimensional array having dimensions of approximately $(M+2N_k) \times N$.

At step 506, the intermediate array $I_x$ is convolved with the Gaussian $1 \times N_k$ kernel $G_y$ to produce a Gaussian-filtered image array $I_G$:

$$I_G = I_x * G_y \quad (14)$$

In accordance with a preferred embodiment, the sigma of the one-dimensional Gaussian kernel $G_y$ is also the spatial scale parameter $\sigma$ selected at step 502. The filtered image array $I_G$ resulting from step 506 is a two-dimensional array having dimensions of approximately $(M+2N_k) \times (N+2N_k)$. Advantageously, because of the separability property of the two-dimensional Gaussian, the filtered image array $I_G$ resulting from step 506 is identical to the result of a complete two-dimensional convolution of an $N_k \times N_k$ Gaussian kernel and the digital mammogram image I. However, the number of multiplications and additions is reduced to $2 \cdot N_k \cdot M \cdot N$ instead of $(N_k)^2 \cdot M \cdot N$.

Even more advantageously, in the situation where $N_k$ is selected to be an odd number and the one-dimensional Gaussian kernels are therefore symmetric about a central element, the number of multiplications is reduced even further. This computational reduction can be achieved because, if $N_k$ is odd, then the component one dimensional kernels $G_x$ and $G_y$ are each symmetric about a central peak element. Because of this relation, the image values corresponding to symmetric kernel locations can be added prior to multiplication by those kernel values, thereby reducing by half the number of required multiplications during the computations of Eqs. (13) and (14). Accordingly, in a preferred embodiment in which $N_k$ is selected to be an odd number, the number of multiplications associated with the required convolutions is approximately $N_k \cdot M \cdot N$ and the number of additions is approximately $2 \cdot N_k \cdot M \cdot N$.

In addition to the computational savings over the embodiment of FIGS. 3 and 4 due to filter separability, it has also been found that the algorithm of FIGS. 3 and 4 may be made even more efficient by taking advantage of the special symmetry of the spatial derivative operators at 0, 45, 90, and 135 in performing operations corresponding to steps 306–310. In particular, it has been found that for each pixel (i,j), the solution for the direction image $\theta_{max}$ and the line intensity function $W_o(\theta_{max})$ can be simplified to the following formulas of Eqs. (15)–(16):

$$W_o(\theta_{max}) = \tfrac{1}{2}(L + \sqrt{(A^2 + D^2)}) \quad (15)$$

$$\theta_{max} = \tfrac{1}{2}a\ \tan(D/A) \quad (16)$$

In the above formulas, the array L is defined as follows:

$$L = W_o(0) + W_o(90) = I_G * D_2(0) + I_G * D_2(90) = I_G * [D_2(0) + D_2(90)] \quad (17)$$

$$L = I_G * \begin{matrix} 0 & -1 & 0 \\ -1 & 4 & -1 \\ 0 & -1 & 0 \end{matrix} \quad (18)$$

As known in the art, the array L is the result of the convolution of $I_G$ with a Laplacian operator. Furthermore, the array A in Eqs. (15) and (16) is defined as follows:

$$A = W_o(0) - W_o(90) = I_G * D_2(0) - I_G * D_2(90) = I_G * [D_2(0) - D_2(90)] \quad (19)$$

$$A = I_G * \begin{matrix} 0 & 1 & 0 \\ -1 & 0 & -1 \\ 0 & 1 & 0 \end{matrix} \quad (20)$$

Finally, the array D in Eqs. (15) and (16) is defined as follows:

$$D = W_o(45) - W_o(135) = I_G * D_2(45) - I_G * D_2(135) = I_G * [D_2(45) - D_2(135)] \quad (21)$$

$$D = I_G * \begin{matrix} 1 & 0 & -1 \\ 0 & 0 & 0 \\ -1 & 0 & 1 \end{matrix} \quad (22)$$

Accordingly, at step 508 the convolution of Eq. (20) is performed on the filtered image array $I_G$ that results from the previous step 506 to produce the array A. At step 510, the convolution of Eq. (22) is performed on the filtered image array $I_G$ to produce the array D, and at step 512, the convolution of Eq. (18) is performed to produce the array L. Since they are independent of each other, the steps 508–512 may be performed in parallel or in any order. At step 514, the line intensity function $W_o(\theta_{max})$ is formed directly from the arrays L, A, and D in accordance with Eq. (15). Subsequent to step 514, at step 516 the line image array L(i,j) is formed from the line intensity function $W_o(\theta_{max})$ using known methods such as a simple thresholding process or a modified thresholding process based on a histogram of the line intensity function $W_o(\theta_{max})$.

Finally, at step 518, the direction image array $\theta_{max}(i,j)$ is formed from the arrays D and A in accordance with Eq. (16). Advantageously, according to the preferred embodiment of FIG. 5, the step 518 of computing the direction image array $\theta_{max}(i,j)$ and the steps 514–516 of generating the line image array L(i,j) may be performed independently of each other and in any order. Stated another way, according to the preferred embodiment of FIG. 5, it is not necessary to actually compute the elements of the direction image $\theta_{max}(i,j)$ in order to evaluate the line intensity estimator function $W_o(\theta_{max})$ at any pixel. This is in contrast to the algorithms described in FIG. 2 and FIGS. 3 and 4, where it is first necessary to compute the direction image $\theta_{max}(i,j)$ in order to be able to evaluate the line intensity estimator function $W_o(\theta)$ at the maximum angle $\theta_{max}$.

It is readily apparent that in the preferred embodiment of FIG. 5, steps 512, 514, and 516 may be omitted altogether if downstream medical image processing algorithms only require knowledge of the direction image array $\theta_{max}(i,j)$. Alternatively, the step 518 may be omitted altogether if downstream medical image processing algorithms only require knowledge of the line image array L(i,j). Thus, computational independence of the direction image array $\theta_{max}(i,j)$ and the line image array L(i,j) in the preferred embodiment of FIG. 5 allows for increased computational efficiency when only one or the other of the direction image array $\theta_{max}(i,j)$ and the line image array L(i,j) is required by downstream algorithms.

The preferred embodiment of FIG. 5 is even less computationally complex than the algorithm of FIG. 3 and 4. In particular, to generate the filtered image array $I_G$ there is required only approximately $N_k \cdot M \cdot N$ multiplications and $2 \cdot N_k \cdot M \cdot N$ additions. To generate the array A from the filtered image array $I_G$, there is required $2 \cdot M \cdot N$ additions and $M \cdot N$ subtractions. Likewise, to generate the array D from the filtered image array $I_G$, there is required $2 \cdot M \cdot N$ additions and $M \cdot N$ subtractions. Finally, to generate L from the filtered image array $I_G$, there is required $M \cdot N$ bitwise left register shift of two positions (corresponding to a multiplication by 4), followed by $4 \cdot M \cdot N$ subtractions. Accordingly, to generate the arrays A, D, and L from the digital mammogram image I, there is required only $2 \cdot N_k \cdot M \cdot N$ multiplications, $2 \cdot N_k \cdot M \cdot N$ additions, $4 \cdot M \cdot N$ additions, $4 \cdot M \cdot N$ subtractions, and $M \cdot N$ bitwise register shifts.

For illustrative purposes in comparing the algorithms, let us again assume the operational parameters assumed previously: that addition, subtraction, and register-shifting operation take 10 clock cycles each; that multiplication takes 30 clock cycles; that $M \times N = 1000 \times 1250$; and that $N_k$ is 11. As computed previously, the Karssemeijer algorithm would require 18.2 billion clock cycles to compute the three line estimator functions $W_o(0)$, $W_o(60)$, and $W_o(120)$, while the algorithm of FIGS. 3 and 4 would require about 6.2 billion clock cycles to generate the four line operator functions $W_o(0)$, $W_o(45)$, $W_o(90)$, and $W_o(135)$, a significant computational advantage. However, using the results of the previous paragraph, the algorithm of FIG. 5 would require only (11)(1000)(1250)(30)+2(11)(1000)(1250)(10)+(4)(1000)(1250)(10)+(4)(1000)(1250)(10)+(1000)(1250)(10)= 0.8 billion clock cycles to produce the arrays A, D, and L. For the preferred embodiment of FIG. 5, the reduction in computation becomes even more dramatic as the scale of interest (reflected by the size of the kernel size $N_k$) grows larger, because the number of computations only increases linearly with $N_k$. It is to be appreciated that the above numerical example is a rough estimate and is for illustrative purposes only to clarify the features and advantages of the present invention, and is not intended to limit the scope of the preferred embodiments.

Optionally, in the preferred embodiment of FIGS. 3–5, a plurality of spatial scale values σ1, σ2, . . . , σn may be selected at step 302 or 502. The remainder of the steps of the embodiments of FIGS. 3–5 are then separately carried out for each of the spatial scale values σ1, σ2, . . . , σn. For a given pixel (i,j), the value of the direction image array $\theta_{max}(i,j)$ is selected to correspond to the largest value among $W_{o1}(\theta_{max1})$, $W_{o2}(\theta_{max2})$, . . . , $W_{on}(\theta_{maxn})$. The line image array L(i,j) is formed by thresholding an array corresponding to largest value among $W_{o1}(\theta_{max1})$, $W_{o2}(\theta_{max2})$, . . . $W_{on}(\theta_{maxn})$ at each pixel.

As another option, which may be used separately or in combination with the above option of using multiple spatial scale values, a plurality of filter kernel sizes $N_{k1}$, $N_{k2}$, . . . , $N_{on}$ may be selected at step 302 or 502. The remainder of the steps of the embodiments of FIGS. 3–5 are then separately carried out for each of the filter kernel sizes $N_{k1}$, $N_{k2}$, . . . , $N_{kn}$. For a given pixel (i,j), the value of the direction image array $\theta_{max}(i,j)$ is selected to correspond to the largest one of the different $W_o(\theta_{max})$ values yielded for the different values of filter kernel size $N_k$. The line image array L(i,j) is formed by thresholding an array corresponding to largest value among the different $W_o(\theta_{max})$ values yielded by the different values of filter kernel size $N_k$. By way of example and not by way of limitation, it has been found that with reference to the previously disclosed system for detecting lines in fibrous breast tissue in a 1000×1250 digital mammogram at 200 micron resolution, results are good when the pair of combinations ($N_k$=11, σ=1.5) and ($N_k$=7, σ=0.9) are used.

The preferred embodiments disclosed in FIGS. 3–5 require a corrective algorithm to normalize the responses of certain portions of the algorithms associated with directional second order derivatives in diagonal directions. In particular, the responses of Eqs. (6b), (6d), and (22) require normalization because the filtered image is being sampled at more widely displaced points, resulting in a response that is too large by a constant factor. In the preferred algorithms that use a Gaussian filter G at step 304 of FIG. 3 or steps 504–506 of FIG. 5, a constant correction factor "p" is determined as shown in Eqs. (23)–(25):

$$p = SQRT\{\Sigma(K_A(i,j))^2 / \Sigma(K_D(i,j))^2\} \quad (23)$$

$$K_A = G * \begin{matrix} 0 & 1 & 0 \\ -1 & 0 & -1 \\ 0 & 1 & 0 \end{matrix} \quad (24)$$

$$K_D = G * \begin{matrix} 1 & 0 & -1 \\ 0 & 0 & 0 \\ -1 & 0 & 1 \end{matrix} \quad (25)$$

In the general case where the digital mammogram image I is convolved with a single-peaked filter F at step 304 of FIG. 3 or steps 504–506 of FIG. 5, the constant correction factor p is determined by using F instead of G in Eqs. (24) and (25).

Importantly, the constant correction factor p does not actually affect the number of computations in the convolutions of Eqs. (6b), (6d), and (22), but rather is incorporated into later parts of the algorithm. In particular, in the algorithm of FIG. 3, the constant correction factor p is incorporated by substituting, for each instance of $W_o(45)$ and $W_o(135)$ in Eqs. (8) and (9), and step 308, the quantities $pW_o(45)$ and $pW_o(135)$, respectively. In the algorithm of FIG. 5, the constant correction factor p is incorporated by substituting, for each instance of D in Eqs. (15) and (16), and steps 514 and 518, the quantity pD. Accordingly, the computational efficiency of the preferred embodiments is maintained in terms of the reduced number and complexity of required convolutions.

A computational simplification in the implementation of the constant correction factor p is found where the size of the spatial scale parameter σ corresponds to a relatively large number of pixels, e.g. on the order of 11 pixels or greater. In this situation the constant correction factor p approaches the value of ½, the sampling distance going up by a factor of √2 and the magnitude of the second derivative estimate going up by the square of the sampling distance. In such case, multiplication by the constant correction factor p is achieved by a simple bitwise right register shift.

As disclosed above, a method and system for line detection in medical images according to the preferred embodiments contains several advantages. The preferred embodiments share the homogeneity, isotropy, and other desirable scale-space properties associated with the Karssemeijer method. However, as described above, the preferred embodiments significantly reduce the number of required computations. Indeed, for one of the preferred embodiments, running time increases only linearly with the scale of interest, thus typically requiring an order of magnitude fewer operations in order to produce equivalent results. For applications in which processing time is a constraint, this makes the use of higher resolution images in order to improve line detection accuracy more practical.

While preferred embodiments of the invention have been described, these descriptions are merely illustrative and are not intended to limit the present invention. For example, although the component kernels of the separable single-peaked filter function are described above as one-dimensional kernels, the selection of appropriate two-dimensional kernels as component kernels of the single-peaked filter function can also result in computational efficiencies, where one of the dimensions is smaller than the initial size of the single-peaked filter function. As another example, although the embodiments of the invention described above were in the context of medical imaging systems, those skilled in the art will recognize that the disclosed methods and structures are readily adaptable for broader image processing applications. Examples include the fields of optical sensing, robotics, vehicular guidance and control systems, synthetic vision, or generally any system requiring the generation of line images or direction images from an input image.

What is claimed is:

1. A method for detecting lines in a digital image, comprising the steps of:
    filtering said digital image to produce a filtered image array;
    convolving said filtered image array with a plurality of second order difference operators designed to extract second order directional derivative information from said filtered image array in a predetermined set of directions;
    processing information resulting from said step of convolving to produce a line image;
    wherein said predetermined set of directions is selected to correspond to an aspect ratio of said second order difference operators.

2. The method of claim 1, wherein said second order difference operators are square kernels, and wherein said predetermined set of directions includes the directions of 0, 45, 90, and 135 degrees.

3. The method of claim 2, wherein said second order difference operators are 3×3 kernels.

4. The method of claim 1, said step of filtering said digital image array comprising the steps of:
    selecting a single-peaked filter kernel; and
    convolving said digital image with said single-peaked filter kernel.

5. The method of claim 4, wherein said single-peaked filter kernel is a separable function comprising the convolution of a first one dimensional kernel and a second one dimensional kernel, and wherein said step of convolving said digital image with said single-peaked filter kernel comprises the steps of convolving said digital image with said first one dimensional kernel and said second one dimensional kernel.

6. The method of claim 4, wherein said single-peaked filter kernel is a Gaussian.

7. The method of claim 1, wherein said step of convolving said filtered image array comprises the steps of:
    convolving said filtered image array with 3×3 second order difference operators designed to extract second order derivative information along the 45 degree and 135 degree directions; and
    subsequent to said step of convolving said filtered image array with 3×3 second order difference operators designed to extract second order derivative information along the 45 degree and 135 degree directions, multiplying the results of said step by a constant correction factor to accommodate for more widely spaced sampling along the diagonals.

8. A method for detecting lines in a digital image, comprising the steps of:
    selecting a spatial scale parameter, said spatial scale parameter corresponding to a desired range of line widths for detection;

convolving said digital image with a first one dimensional kernel and a second one dimensional kernel to produce a filtered image array, said first one dimensional kernel and said second one dimensional kernel each having a size related to said spatial scale parameter;

producing a line image based on second-order spatial derivatives of said filtered image array;

wherein said line image is produced from said digital image using a number of computations that is substantially proportional to the spatial scale parameter such that, as the spatial scale parameter is increased, said number of computations increases at a rate that is less than the rate of increase of the square of the spatial scale parameter.

9. The method of claim 8, said step of producing a line image based on second-order spatial derivatives of said filtered image array further comprising the steps of:

convolving said filtered image array with a plurality of second order difference operators designed to extract second order directional derivative information from said filtered image array in a predetermined set of directions; and processing information resulting from said step of convolving to produce a line image;

wherein said predetermined set of directions includes directions along the diagonals of the digital image.

10. The method of claim 9, wherein said second order difference operators are 3×3 kernels.

11. The method of claim 8, wherein said first one dimensional kernel and said second one dimensional kernel are single-peaked functions.

12. The method of claim 8, wherein said first one dimensional kernel and said second one dimensional kernel are Gaussians.

13. A method for detecting lines in a digital image, comprising the steps of:

selecting a spatial scale parameter, said spatial scale parameter corresponding to a desired range of line widths for detection;

convolving said digital image with a first one dimensional kernel and a second one dimensional kernel to produce a filtered image array, said first one dimensional kernel and said second one dimensional kernel derived from a separable two dimensional kernel, and said first one dimensional kernel and said second one dimensional kernel each having a size related to said spatial scale parameter;

separately convolving said filtered image array with a first, second, and third second order difference operator to produce a first, second, and third resulting array, respectively;

computing a direction image array comprising, at each pixel, a first predetermined scalar function of corresponding pixel values in said first, second, and third resulting arrays;

computing a line intensity function array comprising, at each pixel, a second predetermined scalar function of corresponding pixel values in said first, second, and third resulting arrays; and computing a line image array using information in said line intensity function array.

14. The method of claim 13, wherein said first, second, and third second order difference operators each comprise a 3×3 matrix.

15. The method of claim 13, wherein said first second order difference operator comprises the difference between a horizontal second order difference operator and a vertical difference operator.

16. The method of claim 13, wherein said second second order difference operator comprises the difference between a first diagonal second order difference operator and a second diagonal second order difference operator.

17. The method of claim 13, wherein said third second order difference operator is a Laplacian.

18. The method of claim 13, wherein said first predetermined scalar function comprises the arc tangent of the quotient of said corresponding pixel value in said second resulting array divided by said corresponding pixel value in said first resulting array.

19. The method of claim 13, wherein said second predetermined scalar function comprises the sum of two times the corresponding pixel value in said third resulting array plus the square root of the sum of the squares of the corresponding pixel value in said first resulting array and the corresponding pixel value in said second resulting array.

20. The method of claim 1, wherein said step of computing a line image array using information in said line intensity function array comprises the step of using a modified thresholding process based on a histogram of said line intensity function.

21. A computer-readable medium which can be used for directing an apparatus to detect lines in a digital image, comprising:

means for directing said apparatus to filter said image to produce a filtered array;

means for directing said apparatus to convolve said filtered image array with a plurality of second order difference operators designed to extract second order directional derivative information from said filtered image array in a predetermined set of directions;

means for directing said apparatus to process information resulting from said step of convolving to produce a line image;

wherein said predetermined set of directions is selected to correspond to an aspect ratio of said second order difference operators.

22. The computer-readable medium of claim 21, wherein said second order difference operators are square kernels, and wherein said predetermined set of directions includes the directions of 0, 45, 90, and 135 degrees.

23. The computer-readable medium of claim 2, wherein said second order difference operators are 3×3 kernels.

24. The computer-readable medium of claim 21, said means for directing said apparatus to filter said image to produce a filtered array further comprising means for directing said apparatus to convolve said digital image with a single-peaked filter kernel.

25. The computer-readable medium of claim 21 said means for directing said apparatus to filter said image to produce a filtered array further comprising means for directing said apparatus to convolve said digital image with a separable single-peaked filter kernel by successively convolving said digital image with a first one dimensional component kernel and a second one dimensional component kernel of said separable single-peaked filter kernel.

26. The computer-readable medium of claim 25, wherein said separable single-peaked filter kernel is a Gaussian.

27. An apparatus for detecting lines in digital images, said apparatus comprising:

a first memory for storing a digital image;

a first convolution device capable of convolving said digital image with a first one dimensional kernel and a second one dimensional kernel to produce a filtered image array, said first one dimensional kernel and said second one dimensional kernel derived from a separable two dimensional kernel, and said first one dimensional kernel and said second one dimensional kernel each having a size related to the size of lines being detected;

a second convolution device capable of separately convolving said filtered image array with a first, a second, and a third second order difference operator to produce a first, second, and third resulting array, respectively;

a first processing device capable of computing a direction image array comprising, at each pixel, a first predetermined scalar function of corresponding pixel values in said first, second, and third resulting arrays;

a second processing device capable of computing a line intensity function array comprising, at each pixel, a second predetermined scalar function of corresponding pixel values in said first, second, and third resulting arrays; and a third processing device capable of computing a line image array using information in said line intensity function array.

28. The apparatus of claim 27, wherein said first, second, and third second order difference operators each comprise a 3×3 matrix.

29. The apparatus of claim 27 wherein said first second order difference operator comprises the difference between a horizontal second order difference operator and a vertical difference operator.

30. The apparatus of claim 27, wherein said second second order difference operator comprises the difference between a first diagonal second order difference operator and a second diagonal second order difference operator.

31. The apparatus of claim 27, wherein said third second order difference operator is a Laplacian.

32. The apparatus of claim 27, wherein said first predetermined scalar function comprises the arc tangent of the quotient of said corresponding pixel value in said second resulting array divided by said corresponding pixel value in said first resulting array.

33. The apparatus of claim 27, wherein said second predetermined scalar function comprises the sum of two times the corresponding pixel value in said third resulting array plus the square root of the sum of the squares of the corresponding pixel value in said first resulting array and the corresponding pixel value in said second resulting array.

34. The method of claim 1, wherein said second order difference operators contain elements with magnitudes of 0, 1, and 2.

35. The method of claim 1, wherein said step of convolving said filtered image array with a plurality of second order difference operators comprises the steps of:

producing a doubled filtered image array through register shifts;

subtracting elements in the filtered image array from the doubled filtered image array to extract second order derivative information from said filtered image array in a predetermined set of directions.

36. The method of claim 8, wherein said step of producing a line image based on second-order spatial derivatives of said filtered image array further comprises the steps of:

extracting second order directional derivative information from said filtered image array in a predetermined set of directions; and processing said second order directional information to produce a line image.

37. The method of claim 8, wherein said first one-dimensional kernel and said second one-dimensional kernel each have an odd number of elements.

38. The method of claim 9, wherein the predetermined set of directions includes 0, 45, 90 and 135 degrees.

39. The method of claim 9, wherein said second order difference operators contain elements with magnitudes of 0, 1, and 2.

40. The method of claim 9, wherein said step of convolving said filtered image array with a plurality of second order difference operators comprises the steps of:

producing a doubled filtered image array through register shifts;

subtracting elements in the filtered image array from the doubled filtered image array to extract second order derivative information from said filtered image array in a predetermined set of directions.

41. The method of claim 13, wherein said first, second and third second order difference operators contain elements with magnitudes of 0, 1, and 2.

42. The method of claim 13, wherein said step of separately convolving said filtered image array with a first, second and third second order difference operator comprises the steps of:

producing a doubled filtered image array through register shifts;

subtracting elements in the filtered image array from the doubled filtered image array to extract second order derivative information from said filtered image array in a predetermined set of directions.

43. The computer readable medium of claim 21, wherein said plurality of second order difference operators contain elements with magnitudes of 0, 1, and 2.

44. The computer readable of claim 21, wherein said means for directing said apparatus to convolve said filtered image array comprises:

means for directing said apparatus to produce a doubled filtered image array through register shifts;

means for directing said apparatus to subtract elements in the filtered image array from the doubled filtered image array to extract second order derivative information from said filtered image array in a predetermined set of directions.

45. The apparatus of claim 27, wherein said first, second and third second order difference operators contain elements with magnitudes of 0, 1, and 2.

46. The apparatus of claim 27, wherein said second convolution device is further capable of:

producing a doubled filtered image array through register shifts;

subtracting elements in the filtered image array from the doubled filtered image array to extract second order derivative information from said filtered image array in a predetermined set of directions.

47. A method for detecting lines in a digital image, comprising the steps of:

selecting a spatial scale parameter, said spatial scale parameter corresponding to a desired range of line widths for detection;

convolving said digital image with a filter to produce a filtered image array, said filter having a size related to said spatial scale parameter;

producing a doubled filtered image array through register shifts; and subtracting elements in the filtered image array from the doubled filtered image array to extract second order derivative information from said filtered image array in a predetermined set of directions;

producing a line image based on second-order spatial derivatives of said filtered image array; and processing information resulting from said step of convolving to produce the line image.

48. The method of claim 47, wherein said predetermined set of directions includes the directions of 0, 45, 90 and 135 degrees.

49. The method of claim 47, wherein said second order difference operators are square kernels.

50. The method of claim 47, wherein said second order difference operators are 3×3 kernels.

51. The method of claim 47, said step of convolving said digital image with a filter to produce a filtered image array, comprising the steps of:

selecting a single-peaked filter kernel; and convolving said digital image with said single-peaked filter kernel.

52. The method of claim 51, wherein said single-peaked filter kernel is a separable function comprising the convolution of a first one dimensional kernel and a second one dimensional kernel, and wherein said step of convolving said digital image with said single-peaked filter kernel comprises the steps of convolving said digital image with said first one dimensional kernel and said second one dimensional kernel.

53. The method of claim 51, wherein said single-peaked filter kernel is a Gaussian.

54. The method of claim 47, wherein said step of subtracting elements in the filtered image array from the doubled filtered image array comprising the steps of:

subtracting elements in the filtered image array from the doubled image array to produce a plurality of first subtracted arrays subtracting elements in the filtered image array from the plurality of first-subtracted arrays to extract second order derivative information from said filtered image array in a predetermined set of directions.

55. A computer-readable medium which can be used for directing an apparatus to detect lines in a digital image, comprising:

means for directing said apparatus to filter said image to produce a filtered array;

means for directing said apparatus to produce a doubled filtered array through register shifts; and means for directing said apparatus to subtract elements in the filtered array from the doubled filtered array to extract second order derivative information from said filtered array in a predetermined set of directions; and means for directing said apparatus to process information resulting from said step of subtracting to produce a line image;

wherein said predetermined set of directions is selected to correspond to an aspect ratio of said second order difference operators.

56. The computer-readable medium of claim 55, wherein said predetermined set of directions includes the directions of 0, 45, 90 and 135 degrees.

57. The computer-readable medium of claim 55, said means for directing said apparatus to filter said image to produce a filtered array further comprising means for directing said apparatus to convolve said digital image with a single-peaked filter kernel.

58. The computer-readable medium of claim 55, said means for directing said apparatus to filter said image to produce a filtered array further comprising means for directing said apparatus to convolve said digital image with a separable single-peaked filter kernel by successively convolving said digital image with a first one dimensional component kernel and a second one dimensional component kernel of said separable single-peaked filter kernel.

59. The computer-readable medium of claim 55, wherein said separable single-peaked filter kernel is a Gaussian.

60. An apparatus for detecting lines in digital images, said apparatus comprising:

a first memory for storing a digital image;

a first convolution device capable of convolving said digital image with a first one dimensional kernel and a second one dimensional kernel to produce a filtered image array, said first one dimensional kernel and said second one dimensional kernel each having a size related to the size of lines being detected;

a first register shifting device capable of shifting said digital image to produce a doubled filtered image array;

a first subtracting device capable of subtracting elements in the filtered image array from the doubled filtered image array to extract second order derivative information from said filtered image array in a predetermined set of directions;

a first processing device capable of computing a direction image array comprising, at each pixel, a first predetermined scalar function;

a second processing device capable of computing a line intensity function array comprising, at each pixel, a second predetermined scalar; and a third processing device capable of computing a line image array using information in said line intensity function array.

61. The apparatus of claim 60, wherein said predetermined set of directions includes the directions of 0, 45, 90 and 135 degrees.

62. The apparatus of claim 60, wherein said first and second one dimensional kernel are each a one dimensional component kernel of a single-peaked filter kernel.

63. The apparatus of claim 62, wherein said separable single-peaked filter kernel is a Gaussian.

* * * * *